US009992847B2

(12) United States Patent
Zeidler

(10) Patent No.: US 9,992,847 B2
(45) Date of Patent: Jun. 5, 2018

(54) SELF-ADJUSTING SENSOR FOR SENSING DAYLIGHT

(71) Applicant: ZUMTOBEL LIGHTING GMBH, Dornbirn (AT)

(72) Inventor: Gerd Zeidler, Hoerbranz (AT)

(*) Notice: Subject to any disclaimer, the term of this patent is extended or adjusted under 35 U.S.C. 154(b) by 0 days. days.

(21) Appl. No.: 15/115,170

(22) PCT Filed: Jan. 30, 2015

(86) PCT No.: PCT/EP2015/051913
§ 371 (c)(1),
(2) Date: Jul. 28, 2016

(87) PCT Pub. No.: WO2015/114085
PCT Pub. Date: Aug. 6, 2015

(65) Prior Publication Data
US 2016/0345404 A1 Nov. 24, 2016

(30) Foreign Application Priority Data

Jan. 30, 2014 (DE) .................. 10 2014 201 652

(51) Int. Cl.
H05B 37/02 (2006.01)
G06K 9/46 (2006.01)
G06K 9/62 (2006.01)
H04N 5/235 (2006.01)

(52) U.S. Cl.
CPC ....... H05B 37/0218 (2013.01); G06K 9/4652 (2013.01); G06K 9/4661 (2013.01); G06K 9/6202 (2013.01); H04N 5/2355 (2013.01); Y02B 20/46 (2013.01)

(58) Field of Classification Search
USPC ........................................................ 315/152
See application file for complete search history.

(56) References Cited

U.S. PATENT DOCUMENTS 4,273,999 A * 6/1981 Pierpoint .................. G01J 1/42
250/205
4,445,778 A * 5/1984 Nakauchi ........... G03B 7/09979
356/221
4,701,669 A * 10/1987 Head .................... H05B 39/042
250/205

(Continued)

FOREIGN PATENT DOCUMENTS

WO    2011124722    10/2011

OTHER PUBLICATIONS

International Search Report for PCT/EP2015/051913, English translation attached to original, Both completed by the European Patent Office dated Jul. 6, 2015, All together 5 Pages.

(Continued)

Primary Examiner — Rodney Fuller
(74) Attorney, Agent, or Firm — Brooks Kushman P.C.

(57) ABSTRACT

A sensor unit for ascertaining control data for use in a daylight-dependent light-controlling device having an image sensor for acquiring digital image data as well as a controller for analyzing the image data and creating a brightness signal representing the daylight. The controller is designed such that when creating the brightness signal, same gives more weight to those image regions of the image data acquired by the image sensor which are more greatly influenced by the daylight.

13 Claims, 7 Drawing Sheets

(56) References Cited

U.S. PATENT DOCUMENTS

Figure 1:
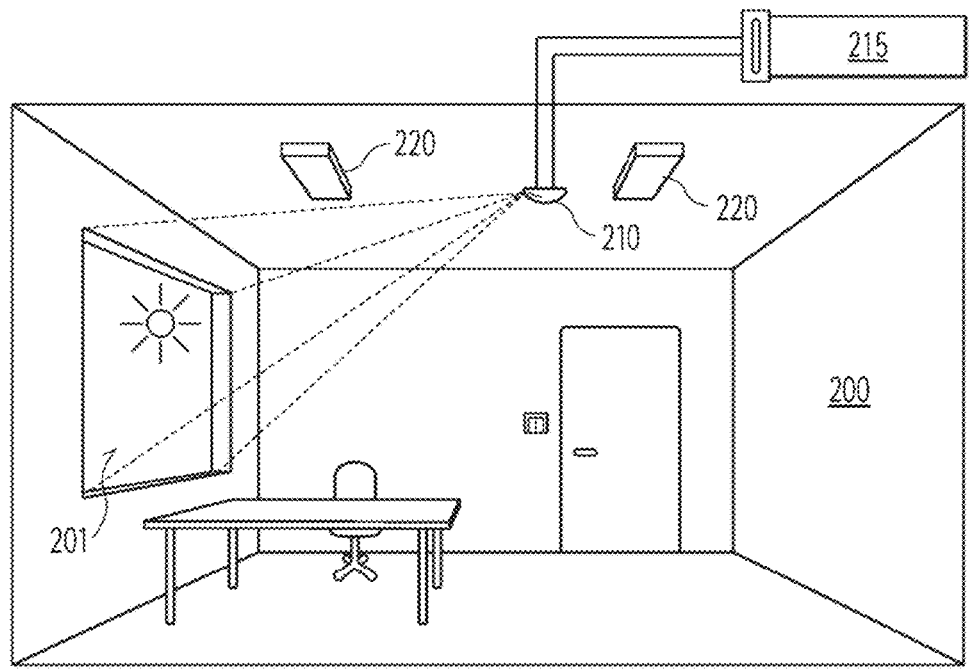

| | | | | |
|---|---|---|---|---|
| 5,663,621 | A * | 9/1997 | Popat | G05D 25/02 160/166.1 |
| 6,084,231 | A * | 7/2000 | Popat | E06B 9/32 160/5 |
| 6,118,231 | A * | 9/2000 | Geiginger | H05B 39/042 315/294 |
| 8,525,462 | B2 * | 9/2013 | Berman | E06B 9/322 318/286 |
| 8,797,321 | B1 * | 8/2014 | Bertolami | G06T 15/50 345/426 |
| 2002/0015097 | A1 | 2/2002 | Martens et al. | |
| 2006/0091822 | A1 * | 5/2006 | Bierman | H05B 37/0218 315/244 |
| 2007/0185675 | A1 | 8/2007 | Papamichael et al. | |
| 2007/0189000 | A1 * | 8/2007 | Papamichael | H05B 39/042 362/1 |
| 2008/0180553 | A1 | 7/2008 | Hassan-Shafique et al. | |
| 2010/0187832 | A1 * | 7/2010 | Holland | G05B 19/042 290/1 A |
| 2010/0235309 | A1 * | 9/2010 | Boleko Ribas | H05B 33/0863 706/13 |
| 2010/0244706 | A1 * | 9/2010 | Steiner | G01J 1/02 315/149 |
| 2010/0244709 | A1 * | 9/2010 | Steiner | G01J 1/02 315/158 |
| 2010/0296081 | A1 * | 11/2010 | Granqvist | F21S 11/00 356/213 |
| 2011/0153088 | A1 * | 6/2011 | Gwerder | G05B 13/048 700/276 |
| 2011/0164304 | A1 * | 7/2011 | Brown | E06B 9/66 359/275 |
| 2012/0057050 | A1 | 3/2012 | Ashdown | |
| 2012/0299486 | A1 * | 11/2012 | Birru | H05B 37/0218 315/153 |
| 2012/0306381 | A1 | 12/2012 | Adler | |
| 2013/0063065 | A1 * | 3/2013 | Berman | H04L 12/2827 318/480 |
| 2013/0229115 | A1 * | 9/2013 | Pandharipande | H05B 37/0218 315/152 |
| 2013/0307419 | A1 * | 11/2013 | Simonian | H05B 33/0869 315/153 |
| 2014/0009069 | A1 * | 1/2014 | Znamenskiy | H05B 37/0227 315/152 |
| 2014/0156079 | A1 * | 6/2014 | Courtney | E06B 9/32 700/275 |
| 2014/0236323 | A1 * | 8/2014 | Brown | G02F 1/163 700/90 |
| 2014/0262057 | A1 * | 9/2014 | Chambers | E06B 9/68 160/5 |
| 2017/0260806 | A1 * | 9/2017 | Adams | E06B 9/32 |

OTHER PUBLICATIONS

Fode, Diploma thesis, Institute of Computer Vision Working Group Computer Graphics Sep. 2004, 62 Pages, Title in German: "Robuste Generierung von High Dynamic Range Bildern", English Machine Translation of Title: "Robust Generation of High Dynamic Range Pictures".

* cited by examiner

SELF-ADJUSTING SENSOR FOR SENSING DAYLIGHT

CROSS-REFERENCE TO RELATED APPLICATION

This application is the U.S. national phase of PCT Application No. PCT/EP2015/051913 filed on Jan. 30, 2015, which claims priority to DE Patent Application No. 10 2014 201 652.5 filed on Jan. 30, 2014, the disclosures of which are incorporated in their entirety by reference herein.

The present invention relates to a light sensor for measuring the brightness in a room, in particular for sensing daylight that falls into a room, for example through windows.

Modern building illumination, in particular illumination in offices and workplaces, is subject to considerable requirements in terms of the chosen light solution. Illumination should be sufficient at all times, integrate seamlessly with the building design, and be easily controllable. At the same time, maintenance and power consumption should be low so as to save costs and be kind to the environment. In order to be able to meet said requirements, what is known as daylight-dependent illumination control is frequently used, wherein the artificial light is adapted to the light that falls into a room from the outside. In this way, the interior illumination can largely be kept constant in dependence on the current external light situation, with artificial illumination being needed only if not enough daylight is available. Not only does the use of complementary daylight result in more natural illumination and therefore a more pleasant ambience, as it were, it is also possible to save energy in this way.

One solution for implementing daylight-dependent light control as is known from the prior art, which is illustrated schematically in FIG. 1, is based on the use of a light sensor 210 which is mounted to the ceiling of a room 200 that is to be illuminated and, aligned with a window area 201, measures the brightness of the external light situation. Based on this external light measurement value, a control device 215, which is connected to the sensor 210, can dim the room lights 220, i.e. adjust their brightness, such that the illuminance within the room that is to be illuminated remains constant. Such light sensors 210 operate based on a specifically adapted photodiode, which is matched to the brightness sensitivity of the human eye.

This known solution for controlling light in dependence on daylight has been reliable for many years and is installed in many buildings. However, in spite of the irrefutable success of this concept, aspirations to improve it persist. Specifically, if the light sensors known from the prior art are to provide a good and meaningful measurement value, appropriate installation instructions must be complied with exactly. For example, no disturbance sources, such as suspended lamps, lintels, mullions and transoms or columns, may be located in the optical axis or within the measurement field of the sensor. Direct incidence of sunlight is also not admissible, since it may falsify the measurement value. By contrast, blinds or shadings in front of the window do not influence the measurement value, or influence it not as negatively, as long as these disturbance sources are the same for all the windows of the room. Accordingly, the window to be evaluated must be chosen as being representative for the room, and the light sensor must be placed exactly in the position that is intended herefor.

Practical experience in the past has shown that the correct installation of the light sensor is a main problem in the solutions known from the prior art. The system is often retroactively installed into existing buildings, where the existing cabling often reaches only to the lighting means which are usually mounted in the central area of the room. It is relatively simple for an electrician to lay signal lines for the light sensor in existing installation pipes, but it is relatively complicated to install new pipes. For this reason, the light sensor is frequently placed where it is possible to do so with little outlay, and not where the light sensor is meant to be situated as per the installation instructions. As a result, the signal of the light sensor cannot provide the correct measurement value and illumination control fails to operate as intended.

In addition, it would be desirable to be able to efficiently filter out of the signal disturbance sources that falsify the measurement value of the sensor. Such disturbance parameters are, for example, artificial light sources, reflections, shadings or short-term disturbance events such as people, vehicles or small clouds moving past the window.

Consequently, the present invention is based on the object of providing a novel sensor for capturing the daylight situation that independently adapts the signal to the correct value, independently of the installation situation. In this context, the sensor should be able to integrate seamlessly in pre-existing systems and should ideally be able to replace existing sensors.

The object is achieved by way of a sensor unit for ascertaining control information for use in a daylight-dependent light control device having the features of claim 1. Advantageous developments of the invention are the subject matter of the dependent claims.

The solution according to the invention is first based on the idea of using an image sensor for capturing the daylight situation that can be used to capture digital image information. As compared to a classical light sensor that does not offer the option of spatial resolution, an image sensor permits capturing of a multiplicity of information items relating to the spatial area that is captured by the image sensor. This, in turn, offers the possibility of blanking, during assessment of the brightness information, those regions of the captured image that contain less information relating to the daylight, or at least of taking it into consideration to a lesser extent. According to the invention, a controller is used to this end, which controller evaluates the digital image information captured by the image sensor and ultimately generates a brightness signal that represents the daylight, wherein the controller, when generating the brightness signal, takes into consideration to a greater extent image regions of image information, captured by the image sensor, that are influenced to a greater extent by the daylight.

According to the invention, a sensor unit for ascertaining control information is therefore proposed for use in daylight-dependent light control, wherein the sensor unit has an image sensor for capturing digital image information and a controller for evaluating the image information and generating a brightness signal which represents the daylight, and wherein the controller is configured to take into consideration to a greater extent, when generating the brightness signal, image regions of image information, captured by the image sensor, that is influenced to a greater extent by the daylight.

The configuration of the sensor unit according to the invention, in particular the specific evaluation of the image information by the controller, permits freer mounting of the sensor unit within a room. In particular, there is no need to comply with strict installation instructions that prescribe that the image sensor exclusively captures a suitable window area. Instead, the image sensor can now also capture additional, disturbing objects, which are then ignored, however, when generating the brightness signal, or at least are taken into consideration to a lesser extent. This considerably simplifies installation of the sensor unit according to the invention as compared to solutions that have been known so far. On the other hand, the sensor unit according to the invention ultimately also outputs a single brightness signal that represents the daylight, just like a classical light sensor. This, in turn, means that the unit according to the invention can replace a classical light sensor without difficulty within a pre-existing illumination system and assume its function.

A particular advantage of the sensor unit according to the invention is here that the controller is configured to independently identify image regions that are influenced to a greater extent by the daylight. The brightness signal is preferably generated here by multiplying brightness information, in particular brightness values of individual image regions or pixels of the image captured by the image sensor, by a weighting factor and by then calculating a value that represents said weighted brightness values overall, i.e. a mean or the sum thereof. The controller is configured here to independently ascertain said weighting factors for the various image regions or pixels and to thus automatically give preference to regions that are relevant with respect to the capture of the daylight. By contrast, the other regions that are not or hardly influenced by the daylight are automatically allocated smaller weighting factors by the controller, with the result that they do not or hardly contribute to the ultimately output signal that represents the daylight.

The weighting factors for the various image regions are preferably determined in the context of a specific optimization algorithm that is performed independently by the sensor unit, wherein to this end the brightness information of images that are captured successively in terms of time are compared to one another. This algorithm is based on the assumption that similar light proportions also behave similarly. This is understood to mean that image regions that are primarily influenced by the daylight will more or less follow the profile of the entire daylight, whereas image regions that are primarily subject to the artificial light are more likely to follow the temporal profile of the artificial light. By observing the brightness changes in the various image regions, these different light classes can be isolated from one another and accordingly the regions that contain information with respect to the daylight can be identified.

According to a first variant within the context of the aforementioned optimization algorithm, the controller can correspondingly be configured to raise the weighting factor associated with an image region if the temporal change in the brightness information of said image region is similar to the temporal change in the overall brightness of the image, and to reduce it if the temporal change in the brightness information of said image region is not similar to the temporal change in the overall brightness of the image.

What has been found here over the course of various test series is that, alternatively to the above-described variant, there is also the possibility of raising the weighting factor associated with an image region if the brightness information of said image region is not similar to the temporal change in the overall brightness of the image, and of reducing it if the brightness information of said image region is similar to the temporal change in the overall brightness of the image. In this case, too, the controller is enabled to automatically identify, after observation of the temporal profile of the brightnesses in the image information, the regions that primarily contain information relating to the daylight.

Provision may be made in both variants for the weighting factors that are changed by the algorithm to be able to be changed only within a specific value range. This way, limit cases, where individual image regions influence the measurement signal to too great an extent or are completely ignored during the assessment, can be excluded.

According to one advantageous development, provision may furthermore be made for the controller—in case color image sensors are used—to output color information or color temperature information in addition to a brightness signal. Particularly conceivable here would be that the controller utilizes findings gathered in the context of the optimization algorithm and not only generates a color information item or a color temperature information item that represents the daylight but also a color information item or color temperature information item that represents the artificial light. This additional information could then be used, for example, for matching the color of the artificial light to the color of the natural daylight.

Further measures can help in reducing the complexity of performing the aforementioned optimization algorithm or of generating the ultimately output signal. A first measure here can be that of initially reducing the resolution of the image captured by the image sensor and of then performing the optimization algorithm merely based on the images having reduced resolution. As a result, processors of relatively simple design can also be used here, and the required memory is kept very small.

Another measure that contributes to the improvement relating to the quality of the brightness signal is that of initially combining a plurality of images which have been captured by the image sensor at various exposure stops into one image having what is referred to as a high brightness dynamic when assessing the image information. The background of this measure is that by comparison with a specialized light sensor, a classical digital image sensor has a lower dynamic range. That means that a single image captured by the image sensor will generally provide information only within a limited brightness range. In order to still be able to ultimately generate a brightness signal that in terms of its range corresponds to the value range of a classical light sensor, a plurality of images is preferably captured in the course of an exposure series and then stitched together into what is known as an HDR image, i.e. an image having a high brightness dynamic. Corresponding methods in this respect are already known from the prior art. The optimization algorithm itself is then performed on the basis of these images having a high brightness dynamic.

It has ultimately been shown that owing to the above-described measures, the information captured by the image sensor can be efficiently evaluated by the controller such that the ultimately obtained brightness signal represents the daylight very well and, in terms of its quality, corresponds to the signal of an optimally mounted classical light sensor. However, the key advantage is that the novel sensor unit no longer needs to be mounted in accordance with strict instructions, while still being able to independently identify the image regions that are relevant for capturing the daylight.

Figure 2:
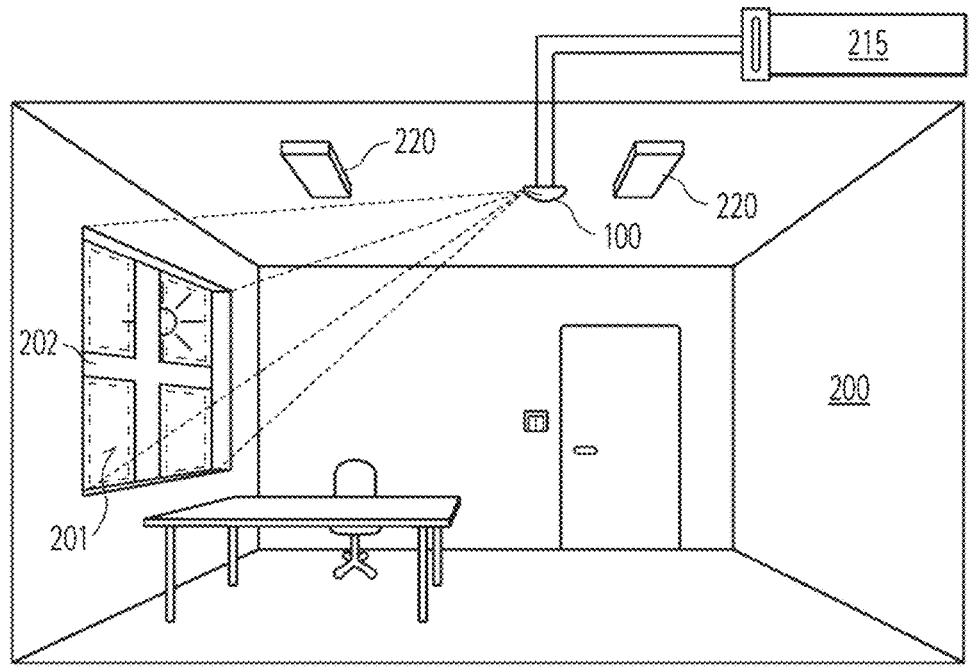
Figure 3:
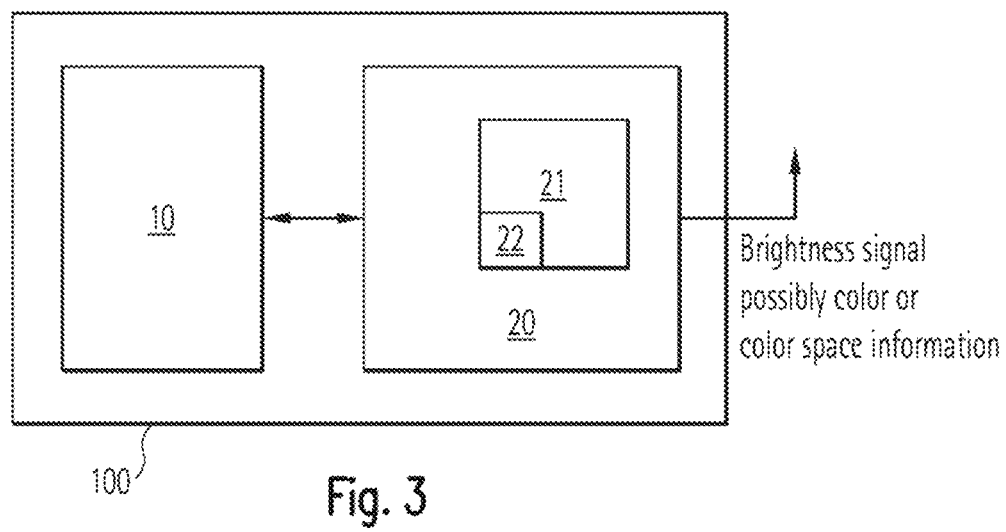
Figure 4:
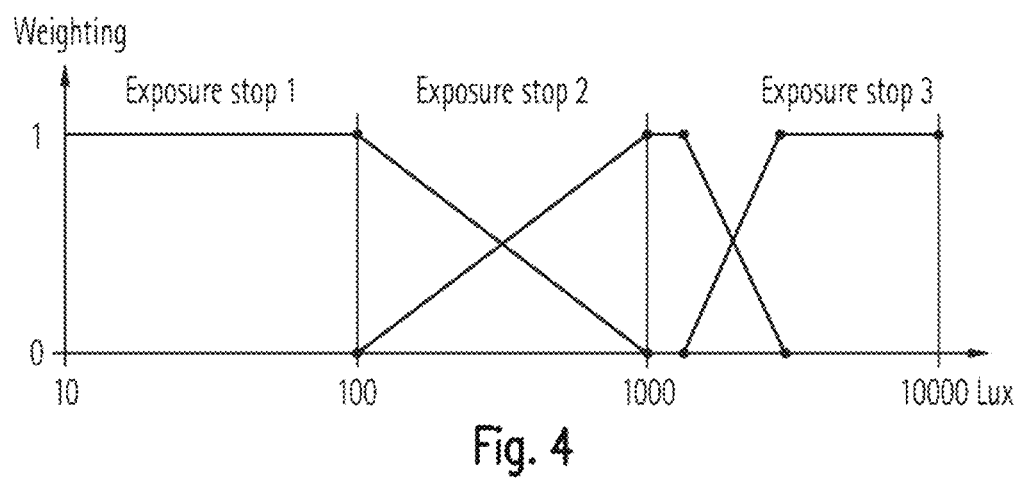
Figure 5:
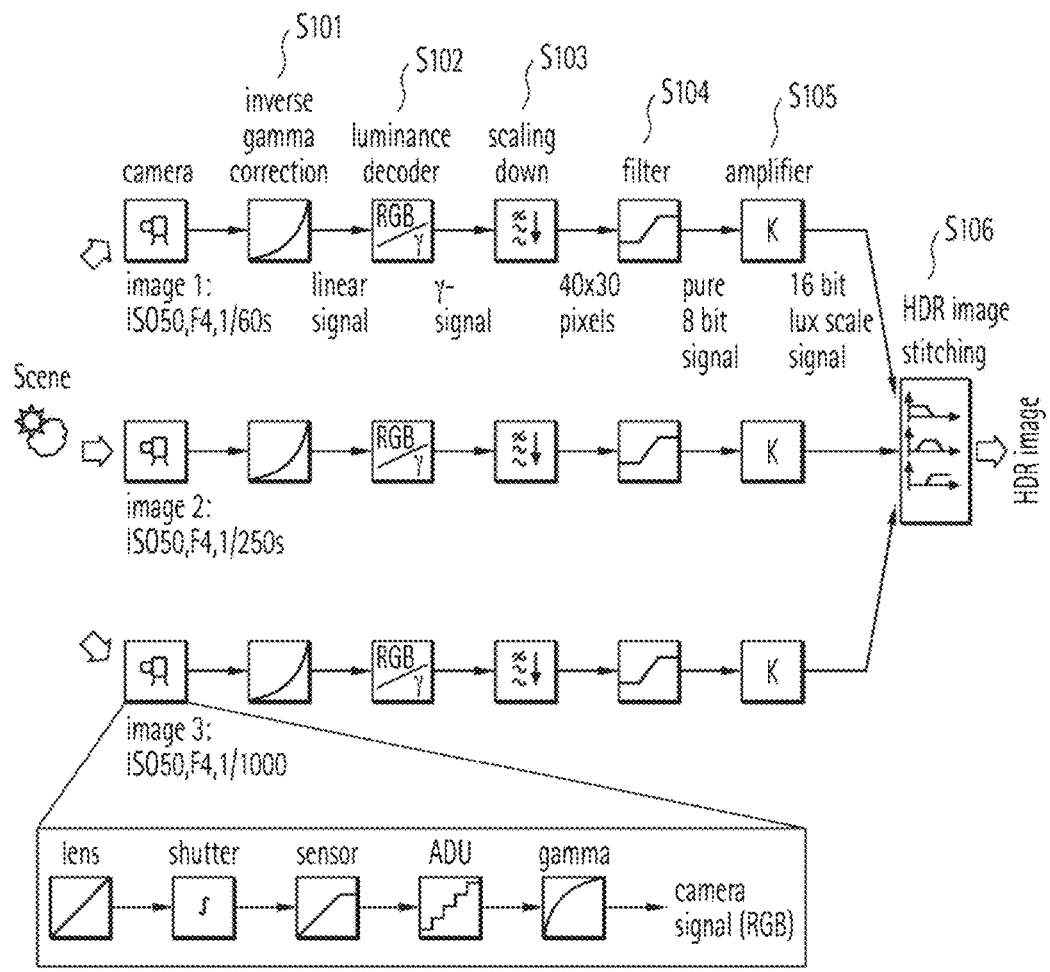
Figure 6:
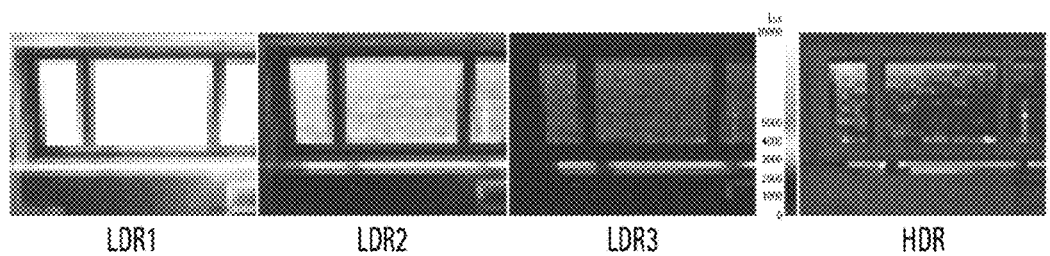
Figure 7A:
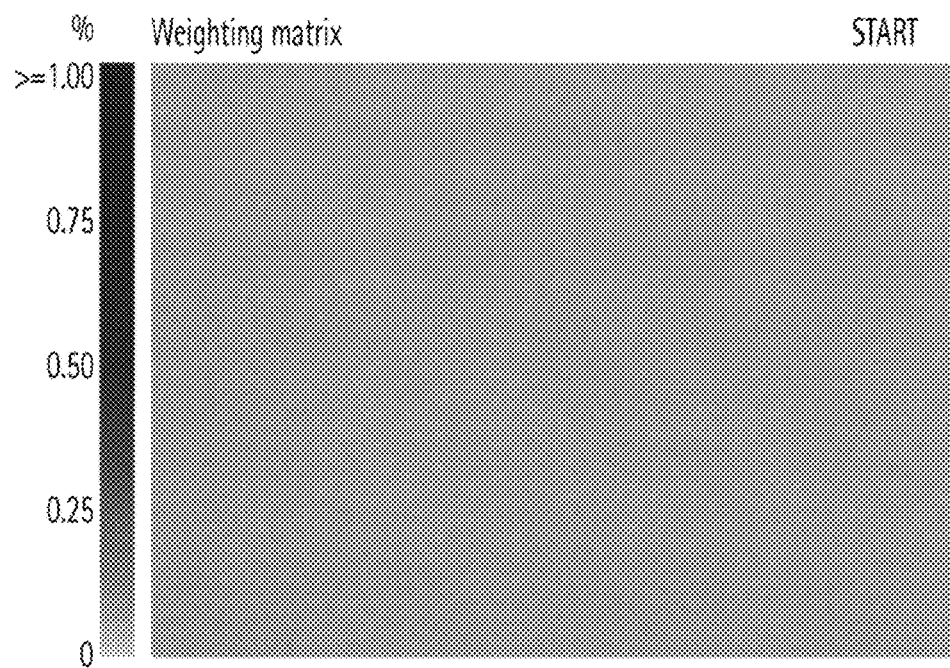
Figure 7B:
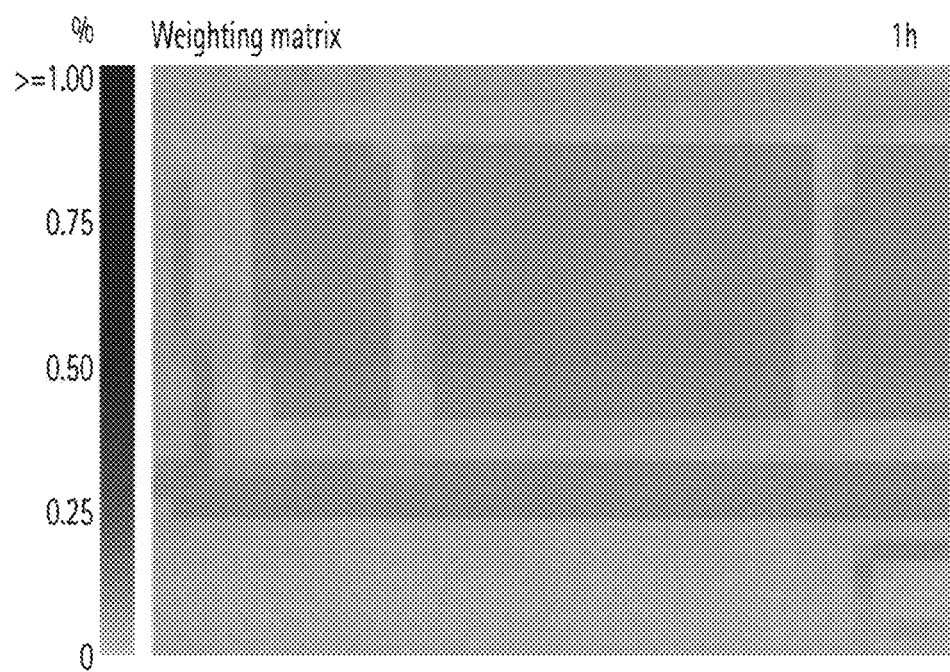
Figure 7C:
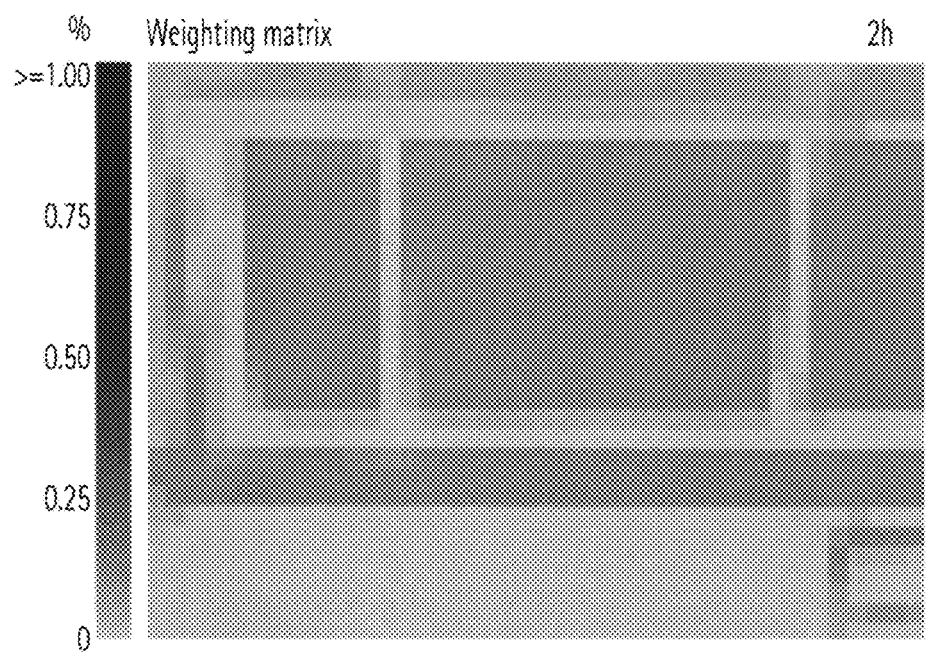
Figure 7D:
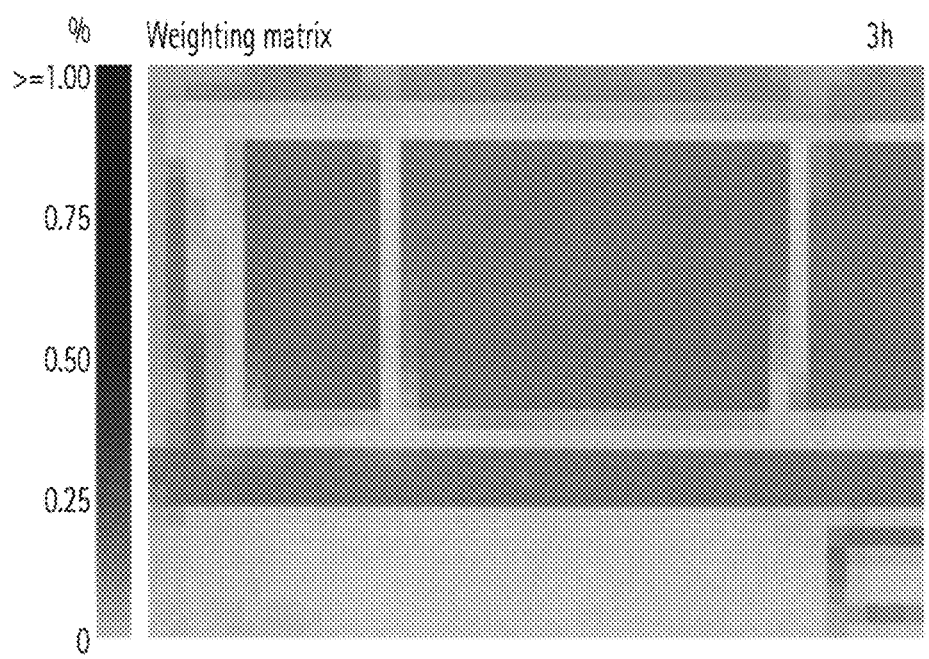
Figure 7E:
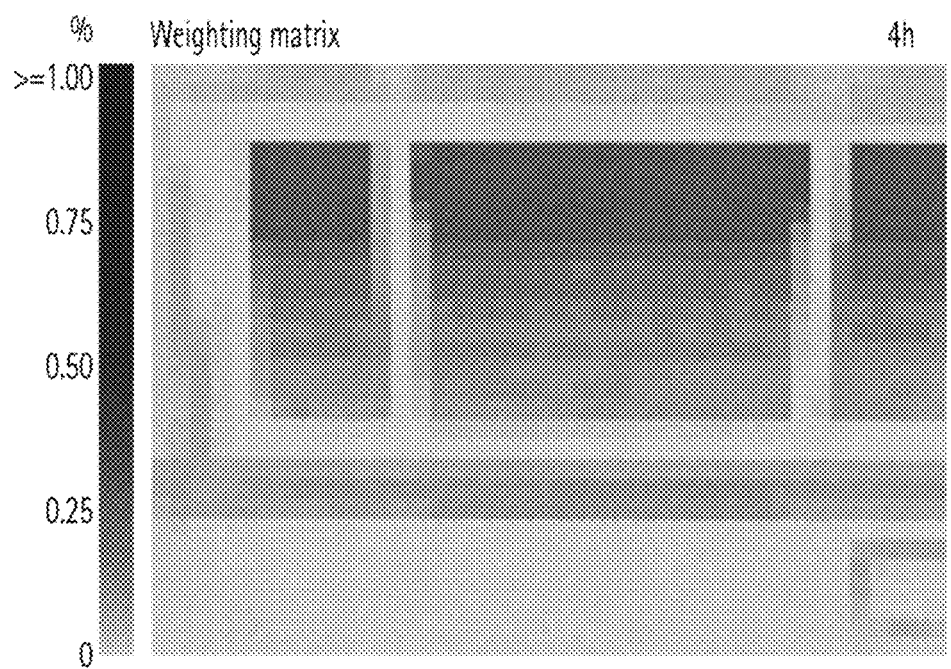
Figure 7F:
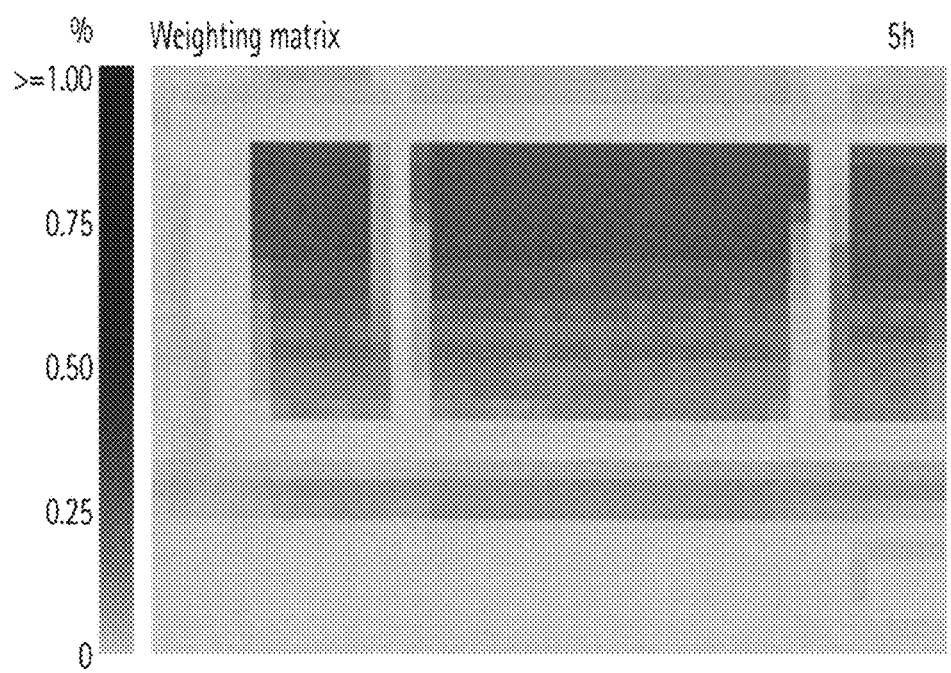
Figure 7G:
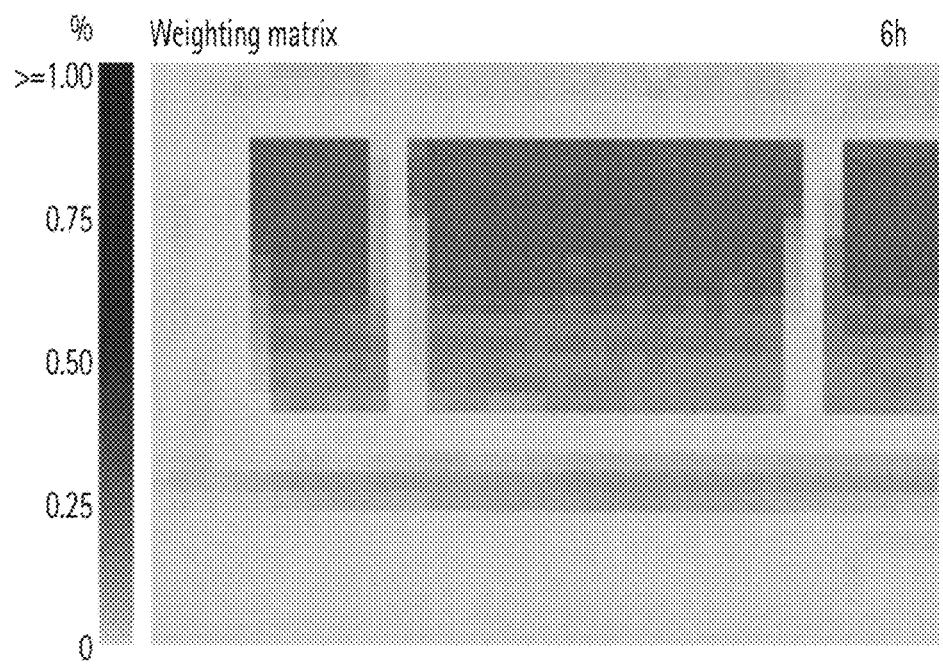
Figure 7H:
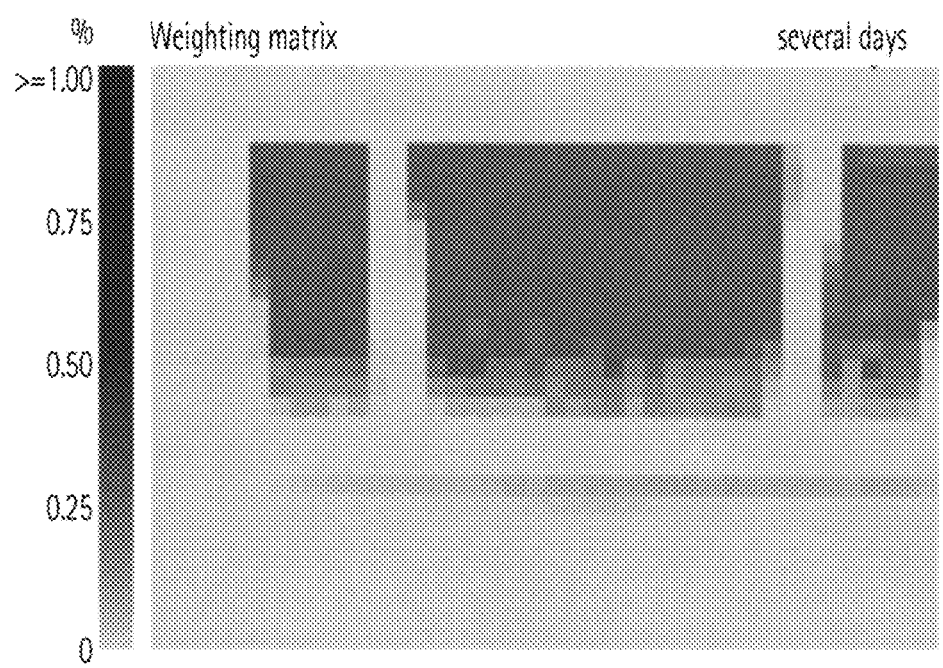

The invention is to be explained in more detail below with reference to the attached drawing, in which:

FIG. 1: shows the components of a system known from the prior art for daylight-dependent illumination control;

FIG. 2: shows a system for daylight-dependent illumination control with a sensor unit according to the invention;

FIG. 3: shows the principle construction of the sensor unit according to the invention;

FIG. 4: shows conceivable weighting functions for stitching together multiple LDR images into one HDR image;

FIG. 5: shows the preparation of the data captured by the image sensor;

FIG. 6: shows the stitching together of three LDR images into one HDR image; and FIGS. 7a to 7h: show the construction of the weighting matrix using the optimization algorithm.

FIG. 2 shows an example of an illumination system, in which a sensor unit 100 according to the invention is employed.

As in the solution known from the prior art, which is illustrated in FIG. 1, the sensor unit 100 is preferably mounted on the ceiling of a room 200 to be illuminated, wherein the sensor unit 100 is aligned with a window area 201 for capturing daylight. The brightness signal emitted by the sensor unit 100 is transmitted to a control device 215 for actuating the lights 220, so as to actuate them such that they are matched in terms of their brightness to the daylight.

What makes the solution according to the invention special is that now the sensor unit 100 according to the invention no longer needs to be arranged such that the region it captures corresponds 100% to the window area 201 or is aligned only with the window area 201 and does not comprise disturbing objects. Instead, the captured region can be larger or the window can have—as illustrated—disturbing objects 202 such as glazing bars or the like, which would normally adversely affect the measurement signal of a classical light sensor. The sensor unit 100 according to the invention is immune to such usually disturbing effects, that is to say is able to automatically suppress or ignore such disturbing objects and yet to communicate a meaningful signal providing details relating to the daylight to the control unit 215.

According to the schematic illustration in FIG. 3, the sensor unit 100 according to the invention substantially consists of two components, specifically an image sensor 10 and a microcontroller 20, wherein both units are preferably arranged inside a common housing, although could also be arranged separately in theory. The image sensor 10 is tasked with generating a digital image of that region with which the sensor unit 100 is aligned. The image sensor 10 thus serves for electronically ascertaining a two-dimensional image of the light situation. The results are stored digitally in images, a matrix or image points (pixels). Depending on the type of image data, a pixels here consists of one brightness value in the case of black and white images or of a plurality of brightness values in the case of color images. In either case, the image data are detected via a matrix of photosensitive components, e.g. a CCD sensor or a CMOS sensor, digitized and transferred to the downstream processing unit, i.e. the controller 20. In the simplest case, the image sensor 10 can be a simple digital camera.

The controller 20 is tasked with controlling the digital camera or the image sensor to initiate the generation of digital images. The controller 20 also analyzes the obtained image data and derives therefrom the ultimately desired brightness signal. Said brightness signal is an individual number value which, comparable with the signal of a classical light sensor, provides details relating to the intensity of the daylight falling into the room. To this end, the controller 20 includes a microcontroller 21 for performing the calculations for the image evaluation and a memory 22—generally integrated in the microcontroller 21—in which at least some of the images transmitted by the image sensor 10 can be intermediately stored.

The value output by the controller 20 is thus derived from the information of the images captured by the image sensor 10. Since this image sensor 10, as mentioned above, is not necessarily aligned only with regions that are influenced by the daylight, it is necessary when generating the ultimate brightness signal to declare which image regions contain daylight-relevant information and for which image regions this is not the case. In the situation that is schematically illustrated in FIG. 2, the signal is ideally generated primarily on the basis of information which relate to the window areas, that is to say the regions illustrated by way of dashed lines. By contrast, all other regions of the image captured by the image sensor 10 are intended to be ignored or at least taken into consideration to a lesser extent.

According to the present invention, this assessment of the image regions is carried out by the controller 20 itself, which, within the context of a special brightness measurement algorithm that will be described in more detail below, evaluates the digital image data and, based thereon, ascertains the brightness signal. In the process, the data transmitted by the image sensor 10 is preferably initially prepared, as will be described in more detail below.

Specifically, considering that the complexity of performing the brightness measurement algorithm according to the invention should be relatively low and should ideally also be performable by a microcontroller having limited resources, it is advantageous to use a comparatively low image resolution for the images that are ultimately to be evaluated. Reducing the image resolution additionally brings about another advantage. Specifically, by lowering the resolution, the brightness signal is subjected to deep pass filtering locally, as it were. High spatial frequencies that are expressed by high contrasts or grayscale differences in the image are automatically suppressed in this way. Local highlights in the image caused, for example, by reflections can be minimized by averaging that is performed for reducing the image resolution. It has been shown that such highlights do not significantly contribute to the room brightness, although they can considerably falsify the measurement value, and therefore the decrease in resolution automatically leads to an improvement in the brightness signal that is ultimately generated. At the same time, the resolution should of course still allow sufficient differentiation between different regions of the image. A resolution of 40×30 pixel has proven a good compromise between these different requirements, wherein in this case a memory usage of 1.2 kB per image for 8 bit/pixel or 2.4 kB per image for 16 bit/pixel is obtained. However, depending on the available resources, a different, in particular a higher resolution can of course also be chosen for the images to be assessed.

Another problem when using an image sensor for ascertaining a brightness signal is the ability to achieve a sufficiently high measurement range, since what is known as the dynamic range of an image sensor is limited, especially as compared to a classical light sensor. The ultimately implementable measurement range for the brightness signal to be output should here be able to cover a range of 0-5000 lux. The output value here corresponds, in a first approximation, to the averaged brightness recorded over the entire image, wherein individual image portions can also significantly exceed 5000 lux.

At this point it should be noted that, strictly speaking, the image sensor and also the human eye can directly measure only luminance (in the unit candela/m$^2$) and not illuminance, which is given in the unit lux. The relationship between luminance and illuminance is represented by what is known as the reflection coefficient. If the latter is considered to be constant—as is assumed here—the signal can be given in lux. This lux value should then not be considered to be an absolute value, but more correctly represents a value that is proportional to the illuminance. This is how the lux values indicated below should be understood.

For the aforementioned reasons it is thus necessary to expand the dynamic range of the image sensor, which is achieved according to a preferred embodiment of the invention with the approach that is described in more detail below. Here, what is known as a high dynamic range image (HDR image), that is to say an image having an increased dynamic range, is ascertained from an exposure series of "ordinary," what are known as low dynamic range (LDR) images which are captured by the image sensor 10. Alternatively, other options for obtaining an HDR image exist, as will be explained in more detail below.

One exposure series here consists of two or more images of the same scene, recorded with different exposure settings. It is optional in this case whether the sensor sensitivity, aperture and/or exposure time is varied. An image with increased contrast range can then be calculated, pixel by pixel, from the different recordings. In a recording that has been overexposed as a whole, dark areas are, for example, exposed correctly, whereas in underexposed recordings light areas, such as clouds in the sky or the like, are correctly exposed. In this way, image portions that ultimately together contribute to the HDR image can be found at every exposure stop.

A plurality of methods for stitching together the images of different exposure stops are known from the prior art. In principle, all known methods are based on the pixel brightness values being linearized, scaled to the new output range, and calculated, weighted by correctness of the measurement value. The main difference is here the choice of the weighting function. Various options in this respect are described, for example, in "Robuste Generierung von High Dynamic Range Bildern (Diplomarbeit)," (Robust Generation of High Dynamic Range Images-Thesis) by Fode A., Institut for Computervisualistik, University of Koblenz and Landau, 2004. According to one preferred embodiment of the invention, a simple weighting function that is optimized in terms of implementation on the microcontroller is used, as will be described in more detail below.

One prerequisite for obtaining an HDR image from this stitching together of a plurality of LDR images relates to the immobility of scene and camera while the exposure series is recorded. Typically, the recordings in an exposure series are taken in quick succession. For the purposes of being able to cleanly perform the calculation including the individual pixels from the different recordings, which after all represent the same image point with different brightnesses, neither scene changes nor camera movements should occur. Any change in any of these factors deteriorates the result. Since scenes that are invariable over time are more likely to be rare, methods have been developed that can tolerate changes in the individual images, wherein corresponding approaches are again known from the prior art that was already mentioned above. It is possible to utilize such complementary measures, wherein for this field of light measurement, however, the prerequisite of being able to record HDR images is relatively good, since the image sensor is located such that it is fixedly mounted—generally on the ceiling—and takes photos of a primarily fixed scene. Minor movements within the image, such as of trees or clouds or even of passers-by, can in this case be accepted as disturbing variables.

Cameras or the image sensors of digital cameras typically do not reproduce brightness values which are ideally linear. These nonlinearities are added deliberately by the manufacturer to create an image impression that is matched to the recording chip and is as natural as possible. However, the HDR image calculation requires linear brightness values so as to be able to join the individual exposure stops. The curve form of what is known as the camera curve usually has a profile that is similar to what are known as gamma curves so as to match the originally linear brightness signal of the image sensor to the logarithmic brightness perception of the human eye. Here, the curved profile of the camera curve can also deviate from an ideal gamma curve and take a different form for each color component. If the image information is output by the image sensor 10 in this modified manner, the values would first need to be corrected in order to again obtain the desired linear form, which can generally be achieved using an inverse gamma function.

Once the linear brightness values of the image data are ascertained, they are then suitably scaled to the target range. Each exposure stop requires herefor its own scaling factor, as a result of which it becomes possible that the values are comparable and that a calculation including them can be performed.

By way of example, the data is mapped onto the lux scale, wherein it is assumed in the following example that the data of the LDR images is present as a black-and-white image with 8-bit/pixel, whereas the HDR target image is intended to comprise 16 bit/pixel. The minimum value is here fixed at 0 lx and the maximum value at 10,000 lx, as a result of which a brightness resolution of 0.15 lx/digit is obtained. Observations have shown that individual image portions can reach a brightness that is significantly above 5000 lx, even if the overall output value of the sensor has not yet reached its maximum of 5000 lx. A maximum value of 10,000 lx accordingly represents a practical magnitude, wherein the range can possibly also be correspondingly adapted.

Tests have shown in this context that, for an exposure series, three exposure stops separated by two what are known as f-stops suffice (the difference from one exposure stop to the next is then referred to as f-stop or frequently as exposure time stop or aperture stop) in order to extend the dynamic range such that the desired measurement range can be covered. In the individual exposure stops, image portions of which the measurement values intersect can be found owing to the previously performed scaling.

It is therefore necessary to decide what measurement value is included in the ultimately formed HDR image. This can be done according to one preferred embodiment of the invention, which is schematically illustrated in FIG. 4, by using a plurality of weighting functions which are constant in pieces and which are multiplied by the measurement values of the LDR images. The weighting functions of the LDR images here overlap in the transition regions, wherein it must be ensured that the overall weighting factor is 1 at each area. The scaling factors and weighting functions here depend on the image sensor that is used and can be determined experimentally, for example, by comparing the ultimately obtained brightness signal with the signal of a classical brightness sensor in the course of a calibration.

The complete process of the HDR image calculation is schematically summarized in FIG. 5. The individual images of the exposure stops are thus first subjected to gamma correction (S101), converted to gray values (S102) and scaled to the target resolution of 40×30 pixels (S103). The 8 bit brightness images thus produced subsequently preferably undergo filtering (S104), in which values at the edges of the value range are removed. Since scaling is effected by way of averaging the pixels of the high-resolution image, it can be assumed that much information of overexposed or underexposed pixels is contained in the margin values. These falsify the measurement value since the magnitude of the incorrect exposure is unknown. The values 32 and 224 serve as threshold values for the filtering, for example. In the subsequent step (S105), the brightness values are scaled to the lux scale and subsequently (S106) plotted, in weighted form, in the HDR image over the appropriate function. This finally produces from a plurality of 8 bit grayscale images a 16 bit HDR image, which forms the starting point for the following optimization algorithm.

FIG. 6 shows, by way of example, the combining of three LDR images into one 16-bit HDR image. Illustrated are three grayscale images produced with different exposure stops in the reduced resolution of 40×30 pixels, which are eventually stitched together into the HDR image illustrated on the right. The latter contains brightness information over the entire desired range from 0 lx to 10,000 lx.

As already mentioned above, the desired HDR image could, however, also be obtained in other ways. For example, image sensors in which the described method of stitching together a plurality of LDR images is already realized internally and which correspondingly already output an HDR image could be used. In addition, image sensors with a logarithmic characteristic could also be used, or a plurality of image sensors could be used which record the same motive with different exposure settings at the same time, wherein the images of the sensors are in turn stitched together to form one HDR image.

Using the HDR image which is produced in the above-described manner, it is thus possible to ascertain the brightness at every area of the region that is captured by the image sensor over the entire measurement range. However, it is necessary for the desired illumination control to produce therefrom a single brightness value that corresponds to the signal of a light sensor that is mounted correctly above the window. That means the brightness values of the different pixels cannot simply be averaged, but need to be suitably weighted with respect to their relevance for the desired brightness signal, such that disturbing elements in the field of view of the image sensor are excluded in the assessment or the influence thereof on the measurement result is at least reduced.

For the brightness sensor according to the invention to be able to independently identify, within the context of a suitable algorithm, the relevance of different image regions or pixels, the following assumptions are made:

the desired measurement value is represented—mainly—by the pixels of the window area. This corresponds to the installation instruction of a classical LSD light sensor which is allowed to look only at open window areas.

"Similar light portions behave similarly." This means pixels that represent daylight portions more or less follow the profile of the (total) daylight. Pixels which are subjected to artificial light, however, are more likely to follow the artificial curve.

Through observation of the pixel values over a relatively long period, the individual light classes can be isolated from one another.

Based on these considerations, it is possible according to the invention to generate a weighting matrix which can be used to obtain a correct measurement signal. What is special about this is that the sensor unit is able to independently optimize this weighting matrix. To this end, the brightness profile of the images captured by the image sensor 10 is observed over a relatively long period. Observing the brightness profile over a relatively long period shows which image portions are subject to strong changes and which image portions remain comparatively constant.

The correct measurement value is then calculated on the basis of an HDR image via the already mentioned weighting matrix. One value per pixel of the image is stored in this matrix, by which the respective brightness value of the associated pixel of the HDR image is multiplied. The sum of these products then gives the total measurement value, which is why the sum of all elements of the weighting matrix should always be 1. If not, the weighted pixel brightness values would have to be summed once again and the corresponding results would have to be normalized.

In the case of the preferred embodiment, each element or each entry in the weighting matrix is initialized with the value 1/(number of pixels). In the case of an image size of 40×30 pixels, this is $1/1200$ or 0.000833. As a result, all pixels are weighted equally and applying this to the HDR image initially corresponds to averaging.

The algorithm that is described below is then applied to this initial form of the weighting matrix, starting from the assumption formulated above of the similar behavior of similar light portions. This algorithm has the following steps:

step 1: initializing weighting matrix (in the present example, factor=$1/1200$).

step 2: ascertaining the gradient of the brightness change of the total image (with respect to the previous image); what is thus ascertained is how the overall brightness of the image has changed.

step 3: loop over all pixels
  i) comparing pixel gradients, i.e. the change in pixel brightness, with the overall gradients
    if the pixel gradient is near the overall gradient (between A*gradient and B*gradient): good pixel, i.e. increase pixel weighting (by factor C);
    otherwise: bad pixel: reduce weighting (factor D);
  ii) limiting minimum and maximum pixel weight so that individual pixels cannot monopolize the entire weighting and low-weighted pixels have a chance to regain weight if they represent "good" daylight—maximum weight: E, minimum weight: F.

step 4: normalizing weighting matrix (overall weight of the matrix set to 1).

The variables A to F mentioned in the above algorithm can here be selected within particular limits, wherein the following exemplary values have proven to work well:

A: 0.1
B: 10
C: 1.1
D: 0.91
E: 0.003 (or 0.3%)
F: 0.00001 (or 0.001%)

In particular the third point of the algorithm is based on the assumption formulated above with respect to similar behavior of light portions. If the change in a pixel value approximately corresponds to the change in the overall brightness, it can be assumed that the corresponding image region is influenced by the daylight and should correspondingly be taken into consideration to an overall greater extent when generating the brightness signal. On the other hand, image regions or pixels that behave differently, i.e. for example are more influenced by the artificial light or otherwise, exhibit deviating behavior and are therefore reduced with respect to their contribution to the overall brightness value.

It has been shown that, alternatively to a comparison of the brightness change of a pixel to the overall brightness change, there is also the option of comparing the current pixel brightness value to the change in the overall brightness. In this case, item 3 of the above-described optimization algorithm changes as follows:

step 3 (alternative): loop over all pixels
  i) comparing the current pixel value with the gradient
    if the pixel value is NOT near the gradient (between A*gradient and B*gradient): good pixel, i.e. increase pixel weighting (by factor C);
    otherwise: bad pixel: reduce weighting (factor D);
  ii) limiting minimum and maximum pixel weighting so that individual pixels cannot monopolize the entire weighting and low-weighted pixels have a chance to regain weight if they represent "good" daylight—maximum weight: E, minimum weight: F.

Once again the exemplary values mentioned above for the variables A to F are well suited for performing the algorithm, although other values would also be conceivable.

The efficiency of the optimization algorithm according to the invention can be gathered from the various illustrations of FIGS. 7a to 7h, which illustrate the buildup of the weighting matrix over several hours. What can be easily seen is that the window areas of the image that is captured by the image sensor emerge even after only a relatively short time. The weightings at the internal walls which are still present in the beginning increasingly reduce over time. After a few days, incorrectly weighted areas are almost completely gone and, when ascertaining the brightness signal, the window areas of the captured image are clearly weighted the strongest.

What has been shown here is that the time interval between the individual recordings for the formation of the weighting matrix plays a somewhat minor role. In the illustrated example, the images were created and assessed at intervals of 5 minutes. Intervals of 1 minute or only 20 seconds, however, give a comparable or the same result. What has also been shown is that the starting time has no influence on the end result, and at most leads to a delay in the buildup of the matrix. However, the optimization algorithm clearly results in the sensor according to the invention, after an adaptation phase, being able to independently subdivide the data captured by the image sensor into daylight-relevant information and irrelevant information so as to create a signal that represents the daylight on the basis of the relevant information.

What should be mentioned here is that the two described variants of the optimization algorithm represent only two exemplary embodiments with which the sensor is enabled to differentiate between daylight-relevant information and daylight-irrelevant information. However, also conceivable would be algorithms with which the assessment of the information that is captured by the image sensor can be performed to identify those regions that are characteristic of the daylight. For example, algorithms for object identification could be used, in which case the associated calculation complexity might be higher.

It should also be noted that—in the case of color image sensors being used—the controller could, in addition to a brightness signal, also output color information or color temperature information. It would be in particular conceivable here for the controller to utilize the findings gathered in the context of the optimization algorithm and generate a color information item or color temperature information item that represents the daylight and also a color information item or color temperature information item that represents the artificial light. To this end, for example a threshold value for the values of the weighting matrix can be defined so as to distinguish between image regions that are associated with the daylight and image regions that are associated with the other vision light. The two color or color temperature information items are then ascertained in each case only on the basis of the corresponding image regions. Alternatively, it would also be possible—as in the calculation of the brightness signal—to utilize the entire image, wherein the color information is then, with respect to the daylight, multiplied again by the entries in the weighting matrix, and inverted entries in the weighting matrix are used in the calculation of the information with respect to the artificial light, such that those regions which are influenced by the daylight to a lesser degree, now have more influence on the result.

The two color or color temperature information items can then, for example, be used in the illumination control as a specified value (color of daylight) and as a current value (color of the artificial light) in order to set the artificial light in dependence on the color of the daylight. This also brings about the advantageous effect that all necessary information is provided by the sensor unit according to the invention, and no additional sensor means are necessary.

Thus for the first time, a sensor is ultimately provided by way of the present invention that is enabled to independently assess the information captured by an image sensor and, based thereon, to generate a brightness signal that represents the daylight. The sensor can here preferably replace, without additional measures, already known daylight sensors or daylight sensors which are already in use, while exhibiting a significantly higher flexibility in terms of the way it is mounted and attached, which in many application cases brings about clear improvements.

The invention claimed is:

1. A sensor unit for ascertaining control information for use in daylight-dependent light control, comprising:
  an image sensor for capturing digital image information and
  a controller for evaluating the image information and generating a brightness signal which represents the daylight,
  wherein the controller is configured to take into consideration to a greater extent image regions of the image information that is captured by the image sensor which are influenced to a greater extent by the daylight when generating the brightness signal;
  wherein the controller is configured to independently identify image regions that are influenced to a greater extent by the daylight;
  wherein for generating the brightness signal, brightness information, in particular brightness values of individual image regions, is/are multiplied by a weighting factor, wherein the controller is configured to independently ascertain the weighting factors for the image regions;
  wherein the controller is configured to determine the weighting factors for the image regions within the context of an optimization algorithm:
  wherein the brightness information of two images that have been captured in temporal succession are compared to one another in the context of the optimization algorithm; and wherein, in the context of the optimization algorithm, the controller
a) increases the weighting factor associated with an image region if the temporal change in the brightness information of this image region is similar to the temporal change of the overall brightness of the image,
b) reduces the weighting factor associated with an image region if the temporal change in the brightness information of this image region is not similar to the temporal change in the overall brightness of the image.

2. The sensor unit as claimed in claim 1, wherein the weighting factors are changed merely within a specified range.

3. The sensor unit as claimed in claim 1, wherein the controller is configured to additionally provide at least one color information item or one color temperature information item with respect to the data captured by the image sensor.

4. The sensor unit as claimed in claim 3, wherein the controller is configured to provide a first color information item or color temperature information item that represents the daylight and a second color information item or color temperature information item that represents the artificial light.

5. The sensor unit as claimed in claim 1, wherein the controller reduces the resolution of the image captured by the image sensor and performs the optimization algorithm on the basis of the images having reduced resolution.

6. The sensor unit as claimed in claim 1, wherein the controller is configured to combine a plurality of images captured by the image sensor at different exposure stops into one image having increased brightness dynamic and to perform the optimization algorithm based on the images having increased brightness dynamic.

7. A sensor unit for ascertaining control information for use in daylight-dependent light control, comprising:
an image sensor for capturing digital image information and
a controller for evaluating the image information and generating a brightness signal which represents the daylight,
wherein the controller is configured to take into consideration to a greater extent image regions of the image information that is captured by the image sensor which are influenced to a greater extent by the daylight when generating the brightness signal;
wherein the controller is configured to independently identify image regions that are influenced to a greater extent by the daylight;
wherein for generating the brightness signal, brightness information, in particular brightness values of individual image regions, is/are multiplied by a weighting factor, wherein the controller is configured to independently ascertain the weighting factors for the image regions;
wherein the controller is configured to determine the weighting factors for the image regions within the context of an optimization algorithm:
wherein, in the context of the optimization algorithm, the controller
a) increases the weighting factor associated with an image region if the brightness information of this image region is not similar to the temporal change in the overall brightness of the image,
b) reduces the weighting factor associated with an image region if the brightness information of this image region is similar to the temporal change in the overall brightness of the image.

8. A method for ascertaining control information for use in daylight-dependent light control, having the following steps:
capturing digital image information using an image sensor and
evaluating the image information and generating a brightness signal which represents the daylight,
wherein image regions of the image information captured by the image sensor which are influenced to a greater extent by the daylight are taken into consideration to a greater extent when generating the brightness signal;
wherein for generating the brightness signal, brightness information, in particular brightness values of individual image regions, is/are multiplied by a weighting factor;
wherein the weighting factors for the image regions are optimized within the context of an optimization algorithm;
wherein the brightness information of two images that have been captured in temporal succession are compared to one another in the context of the optimization algorithm;
wherein, in the context of the optimization algorithm,
a) the weighting factor associated with an image region is increased if the temporal change in the brightness information of this image region is similar to the temporal change in the overall brightness of the image,
b) the weighting factor associated with an image region is reduced if the temporal change in the brightness information of this image region is not similar to the temporal change in the overall brightness of the image.

9. The method as claimed in claim 8, wherein the weighting factors are changed only within a specified range.

10. The method as claimed in claim 8, wherein additionally at least one color information item or one color temperature information item with respect to the data captured by the image sensor is provided,
wherein preferably a first color information item or color temperature information item representing the daylight and a second color information item or color temperature information item representing the artificial light are provided.

11. The method as claimed in claim 8, wherein the resolution of the image captured by the image sensor is reduced and the optimization algorithm is performed on the basis of the images having reduced resolution.

12. The method as claimed in claim 8, wherein a plurality of images captured by the image sensor at different exposure stops is combined into one image having increased brightness dynamic and the optimization algorithm is performed based on the images having increased brightness dynamic.

13. A method for ascertaining control information for use in daylight-dependent light control, having the following steps:
capturing digital image information using an image sensor and
evaluating the image information and generating a brightness signal which represents the daylight,
wherein image regions of the image information captured by the image sensor which are influenced to a greater extent by the daylight are taken into consideration to a greater extent when generating the brightness signal;

wherein for generating the brightness signal, brightness information, in particular brightness values of individual image regions, is/are multiplied by a weighting factor;

wherein the weighting factors for the image regions are optimized within the context of an optimization algorithm;

wherein the brightness information of two images that have been captured in temporal succession are compared to one another in the context of the optimization algorithm;

wherein, in the context of the optimization algorithm, a) the weighting factor associated with an image region is increased if the brightness information of this image region is not similar to the temporal change in the overall brightness of the image, b) the weighting factor associated with an image region is reduced if the brightness information of this image region is similar to the temporal change in the overall brightness of the image.

* * * * *